(12) United States Patent
Mahoor et al.

(10) Patent No.: US 9,810,975 B2
(45) Date of Patent: Nov. 7, 2017

(54) REAR-PROJECTED LIFE-LIKE ROBOTIC HEAD

(71) Applicant: Colorado Seminary, Denver, CO (US)

(72) Inventors: Mohammad H. Mahoor, Lone Tree, CO (US); Ali Mollahosseini, Denver, CO (US); Luke Skelly, Denver, CO (US); Quinn Martindale-George, Denver, CO (US)

(73) Assignee: University of Denver, Denver, CO (US)

( * ) Notice: Subject to any disclaimer, the term of this patent is extended or adjusted under 35 U.S.C. 154(b) by 0 days.

(21) Appl. No.: 15/042,002

(22) Filed: Feb. 11, 2016

(65) Prior Publication Data

US 2016/0231645 A1  Aug. 11, 2016

Related U.S. Application Data

(60) Provisional application No. 62/115,023, filed on Feb. 11, 2015.

(51) Int. Cl.
*G03B 21/14* (2006.01)
*G03B 21/10* (2006.01)
(Continued)

(52) U.S. Cl.
CPC ........... *G03B 21/145* (2013.01); *G03B 21/10* (2013.01); *G03B 21/606* (2013.01); *G03B 21/62* (2013.01);
(Continued)

(58) Field of Classification Search
CPC ..... G03B 21/145; G03B 21/147; G03B 21/32
See application file for complete search history.

(56) References Cited

U.S. PATENT DOCUMENTS

| 1,653,180 | A | * | 12/1927 | Georges | ................. | A63H 3/003 |
| | | | | | | 353/28 |
| 3,973,840 | A | * | 8/1976 | Jacobs | ................... | G09F 27/00 |
| | | | | | | 352/10 |

(Continued)

FOREIGN PATENT DOCUMENTS

| CN | 200998593 Y | 1/2008 |
| CN | 101474481 A | 7/2009 |

(Continued)

OTHER PUBLICATIONS

Moubayed, Samuel A., et al., "The Furhat Back-Projected Humanoid Head-Lip Reading, Gaze and Multi-Party Interaction", Apr. 2, 2013, International Journal of Humanoid Robotics.

(Continued)

*Primary Examiner* — Sultan Chowdhury
*Assistant Examiner* — Magda Cruz
(74) *Attorney, Agent, or Firm* — Maschoff Brennan

(57) ABSTRACT

Some embodiments of the invention are directed toward a robotic head that includes a head enclosure; a translucent face mask coupled with the head enclosure, having a front side and a rear side; a neck system coupled with the head enclosure and configured to move the head enclosure; and a projector coupled with the head enclosure and disposed to project images of a face onto the rear side of the face mask.

19 Claims, 11 Drawing Sheets
(1 of 11 Drawing Sheet(s) Filed in Color)

(51) Int. Cl.
*G03B 21/606* (2014.01)
*G03B 21/62* (2014.01)
*H04N 9/31* (2006.01)

(52) U.S. Cl.
CPC ......... *H04N 9/3141* (2013.01); *H04N 9/3185* (2013.01)

(56) References Cited

U.S. PATENT DOCUMENTS

| | | | | |
|---|---|---|---|---|
| 4,978,216 | A * | 12/1990 | Liljegren | G09F 19/18 353/28 |
| 5,221,937 | A * | 6/1993 | Machtig | G03B 21/00 353/28 |
| 5,572,229 | A | 11/1996 | Fisher | |
| 6,467,908 | B1 * | 10/2002 | Mines | G09F 19/08 353/28 |
| 7,113,848 | B2 | 9/2006 | Hanson | |
| 8,256,904 | B2 | 9/2012 | Reichow et al. | |
| 2002/0015037 | A1 * | 2/2002 | Moore | G06F 3/011 345/419 |
| 2009/0292614 | A1 * | 11/2009 | Reichow | G03B 21/10 705/14.72 |
| 2011/0087354 | A1 | 4/2011 | Tye et al. | |
| 2011/0144804 | A1 | 6/2011 | Song et al. | |
| 2012/0038739 | A1 | 2/2012 | Welch et al. | |
| 2014/0142757 | A1 | 5/2014 | Ziegler et al. | |

FOREIGN PATENT DOCUMENTS

| | | |
|---|---|---|
| CN | 201638526 U | 11/2010 |
| CN | 101570019 B | 3/2011 |
| CN | 102566474 A | 7/2012 |
| CN | 103400282 A | 11/2013 |

OTHER PUBLICATIONS

Frederic Delaunay, "Lighthead Robotic Face", Human-Robot Interaction (HRI), 2011 6th ACM/IEEE International Conference on Mar. 8-11, 2011.
Takaaki Kuratae, "Mask-bot": a life-size robot head using talking head animation for human-robot communication, 2011 IEEE-RAS International Conference on Humanoid Robots Bled, Slovenia, Oct. 26-28, 2011.
Frederic Delaunay, "Towards retro-projected robot faces": an alternative to mechatronic and android faces, Robot and Human Interactive Communication, 2009. RO-MAN 2009. The 18th IEEE International Symposium on, Sep. 27-Oct. 2, 2009.
Dejan Todorovic, "Geometrical basis of perception of gaze direction", ScienceDirect, Oct. 2006.
Susumu Tach, "Mutual telexistence system using retro-reflective projection technology", Proceedings of the 5th Virtual Reality International Conference May 13-18, 2003, pp. 69/1-69/9.
Bischoff, et al., "Improving dependability of humanoids", 2001, IEEE, p. 1-8.
Fumiya Lida, "Behavior learning of a face robot using human natural instruction", Robot and Human Interaction, 1999. RO-MAN '99. 8th IEEE International Workshop on Sep. 27-29, 1999, IEEE p. 171-176.
Hara et al., "Real-time facial interaction between human and 3D face robot agent", Robot and Human Communication, 1996., 5th IEEE International Workshop on Nov. 11-14, 1996, IEEE p. 401-409.
M. Hashimoto, "Facial expression of a robot using a curved surface display", Intelligent Robots and Systems, 2005. (IROS 2005). 2005 IEEE/RSJ International Conference on Aug. 2-6, 2005, p. 765-770.
Brennand Pierce, "Development of an integrated multi-model communication robotic face", 2012 IEEE Workshop on Advanced Robotics and its Social Impacts, ARSO 2012, Munich May 21-23, 2012.
Samer Al Moubayed, "Furhat: A Back-Projected Human-Like Robot Head for Multiparty Human-Machine Interaction", Lecture Notes in Computer Science, vol. 7403 pp. 114-130.

* cited by examiner

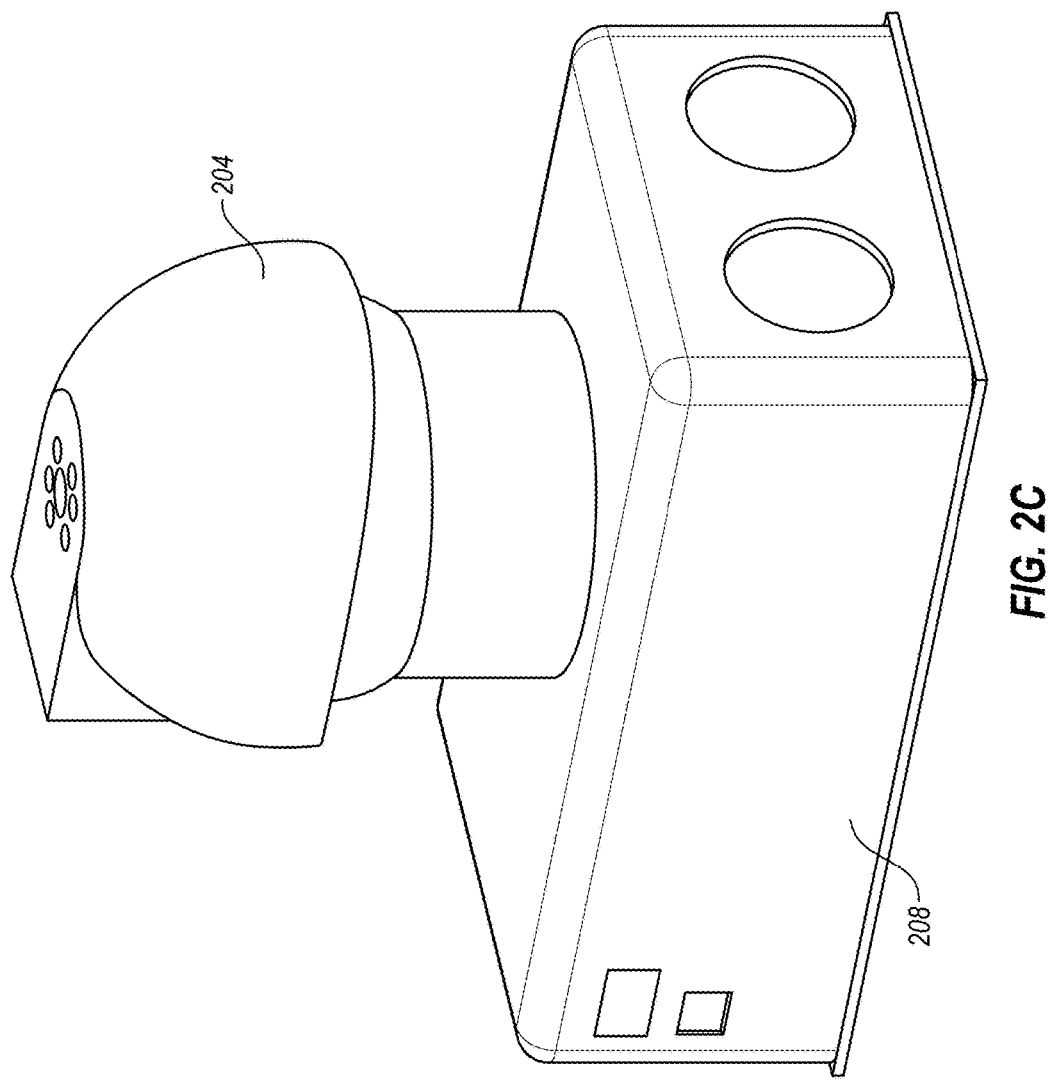

US 9,810,975 B2

REAR-PROJECTED LIFE-LIKE ROBOTIC HEAD

SPONSORED RESEARCH AND DEVELOPMENT

This invention was made with government support under Grant Numbers IIP1449747 and IIS1111568 awarded by The National Science Foundation. The government has certain rights in the invention.

BACKGROUND

Current robot technologies have yet to reach the full emotional and social capabilities necessary for rich and robust interaction with human beings. Robots with emotional and social capabilities may be useful for interacting with people in home situations, such as the elderly, Alzheimer's patients, children with autism, or others who may benefit from an interactive robot. Robotic heads that can model natural face-to-face communication with individuals in different social, learning, and therapeutic contexts may be desired. Such robotic heads may help overcome the "Uncanny Valley" effect, where the effect of an aesthetic design of a robot may influence the user's experience, perception, and acceptance of the robot.

SUMMARY

Some embodiments of the invention are directed toward a robotic head that includes a head enclosure; a translucent face mask coupled with the head enclosure, having a front side and a rear side; a neck system coupled with the head enclosure and configured to move the head enclosure; and a projector coupled with the head enclosure and disposed to project images of a face onto the rear side of the face mask.

In some embodiments, the robotic head includes a lens with a wide-projection angle through which the projector projects images of a face onto the rear side of the face mask.

In some embodiments, the face mask is removably coupled with the head enclosure.

In some embodiments, the face mask includes a plurality of facial features.

In some embodiments, the projector is coupled with an external rear portion of the head enclosure, and the head enclosure includes a hole through which the projector projects images of a face onto the rear side of the face mask.

In some embodiments, the neck system includes a pan-tilt unit that moves the head enclosure with two or three degrees of freedom. In some embodiments, the neck moves the head enclosure with one-hundred to one-hundred fifty degrees of yaw, fifteen to thirty degrees of pitch, and fifteen to thirty degrees of roll. In some embodiments, the neck comprises at least one of a servomotor and a gear.

In some embodiments, the head enclosure has a shape that is substantially half ovoid.

In some embodiments, the robotic head includes a wig.

In some embodiments, the projector is configured to project changes in facial expression onto the rear side of the face mask.

Some embodiments include a robotic head projection calibration method that includes projecting a two-dimensional image of a face with a plurality of fiducial marker points onto a rear surface of a face mask; recording an image of the face mask with the plurality of fiducial marker points projected onto the rear surface of the face mask; determining a plurality of distances between the location of each of the plurality of fiducial marker points on the face mask relative to an expected location of each of the plurality of fiducial marker points on the face mask; calculating a transformation based on the plurality of distances; and applying the transformation to two-dimensional images of a face.

BRIEF DESCRIPTION OF THE FIGURES

These and other features, aspects, and advantages of the present disclosure are better understood when the following Disclosure is read with reference to the accompanying drawings. The patent or application file contains at least one drawing executed in color. Copies of this patent or patent application publication with color drawing(s) will be provided by the Office upon request and payment of the necessary fee.

FIG. 2C is a perspective view of the neck system illustrated in FIG. 2B.

DETAILED DESCRIPTION

In some embodiments described herein, two-dimensional (2D) and three-dimensional (3D) facial images may be rear-projected onto a human-like face of a robotic head. In some embodiments, the face of the robotic head may include a face mask that is removable and/or interchangeable. In some embodiments, the face mask may be a translucent face mask onto which the facial images may be projected. In some embodiments, the face mask may be constructed or molded from a clear plastic and/or coated with rear projection paint. In some embodiments, the face mask of the robotic head may be 3D, which may reduce the Mona Lisa Effect that may result when 3D objects are displayed on 2D surfaces. In some embodiments, the facial images may be created using a character animation application and may include natural speech and facial expressions. The facial images may, for example, be cartoon-like, animated, and/or photorealistic. In some embodiments, the character animation application may calibrate the facial images for a particular face mask.

In some embodiments described herein, the robotic head may include a neck system that may allow the robotic head to move in a manner that resembles movement of a human head. In some embodiments, the robotic head may include enclosures, such as, for example, an enclosure for the neck system, which may make the robotic head more realistic and also may prevent projected light from being scattered from the sides of the robotic head so the facial image may look brighter.

Figure 1A:
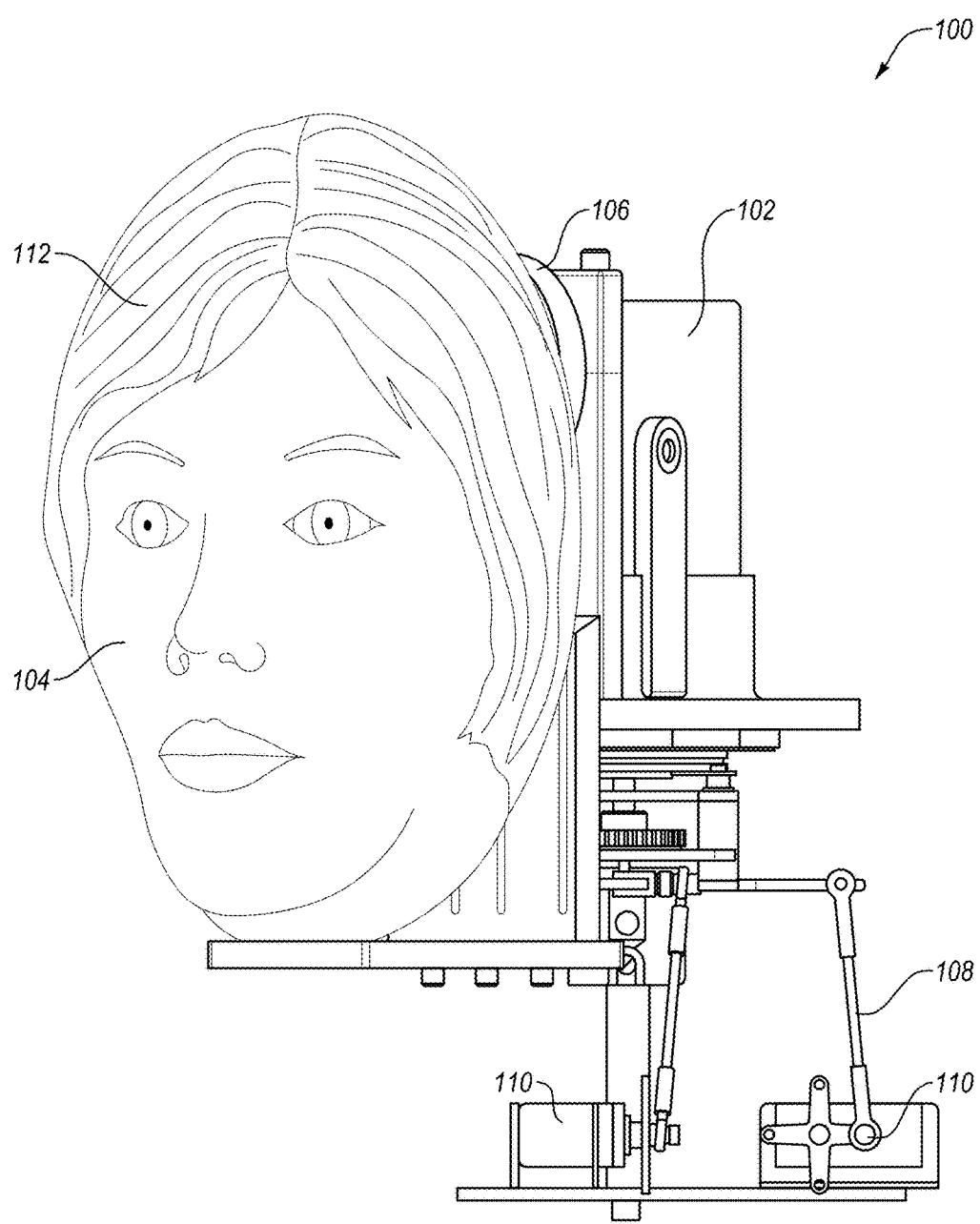
FIG. 1A is a perspective view of an example robotic head.
Figure 1B:
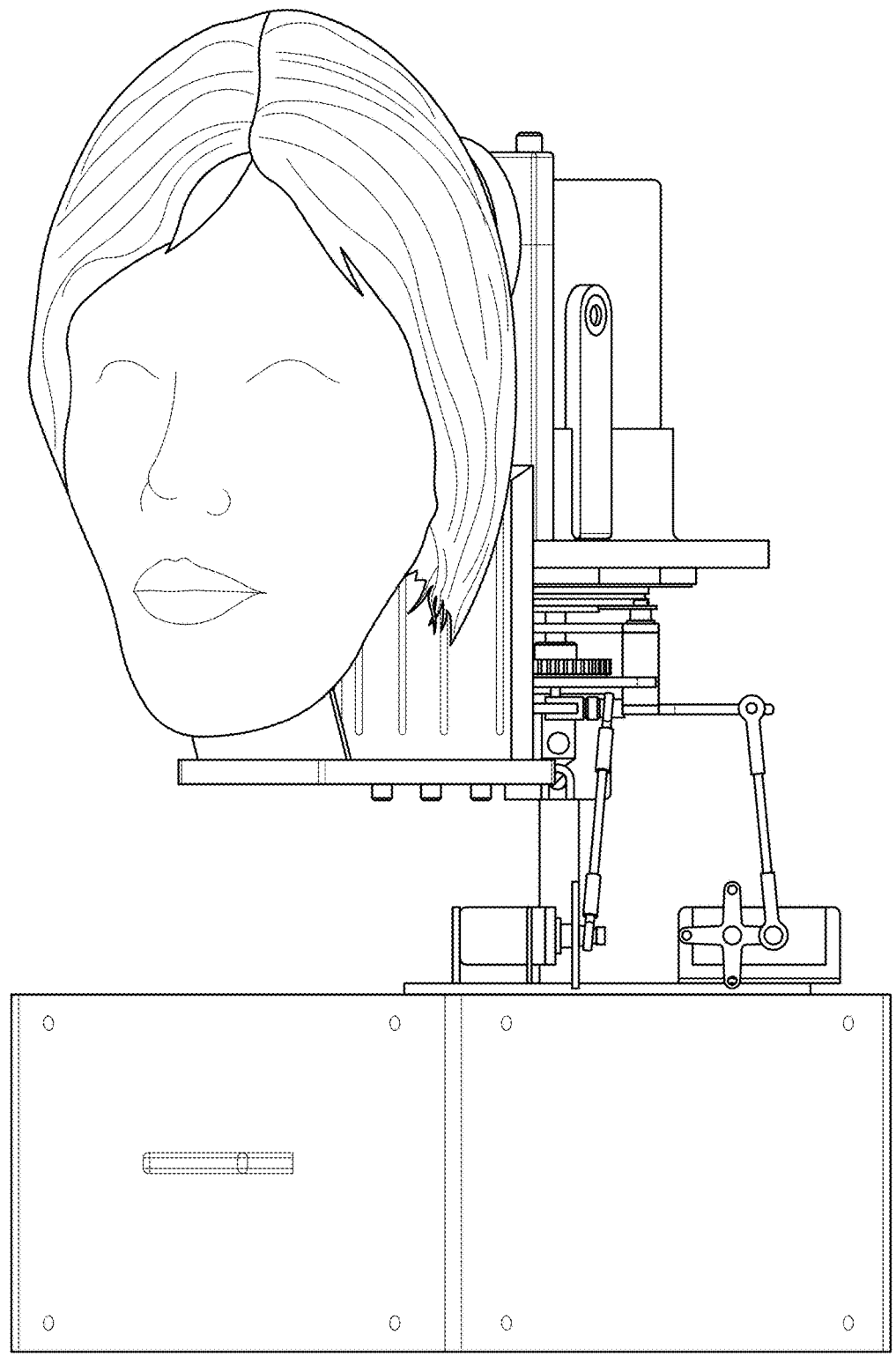
FIG. 1B is another perspective view of the robotic head illustrated in FIG. 1A.

An example robotic head 100 is shown in FIG. 1A and FIG. 1B. In some embodiments, the robotic head 100 may include a display system. The display system may include a projector 102 that projects a facial image on a face mask 104 of the robotic head 100. In some embodiments, the projector 102 may use rear-projection to project the facial image on the face mask 104. In some embodiments, the projector 102 may include a lens 106 with a wide-projection angle, such as, for example, a fish eye lens. In some embodiments, the projector 102 may be portable. In some embodiments, the projector 102 may be high-resolution and/or high-luminosity. In some embodiments, the projector 102 may be able to display a resolution of approximately 1200 by 800 pixels and may have a contrast ratio of approximately 10,000 to one. The projector 102 may be capable of up to, for example, 300 ANSI Lumens under normal indoor illumination conditions. The projector 102 may, for example, be a Dell DLP M110 portable projector (e.g., a DLP projector) or other similar DLP projector.

In some embodiments, the projector 102 may include or be attached to an optical lens converter. The converter may reduce the focal length of the projector 102 and increase the viewing angle of the projector 102. For example, the projector 102 may be attached to a Nikon Fisheye Converter FC-E8 or similar converter. The converter may, for example, allow the projector 102 to display the facial image on the entire face mask 104 of the robotic head 100 from a relatively close distance. In some embodiments, various optical element such as, for example, a prism or a mirror, may be used to project images to the face mask 104 such as, for example, to make the distance between the projector and the mask shorter and the head more compact.

In some embodiments, the robotic head 100 may include a neck system. In some embodiments, the neck system may control the projector 102 and/or position of the face mask 104. In some embodiments, a character animation application may control the neck system to rotate the face mask 104 to track user faces (hereinafter referred to as "face tracking") and user hand gestures (hereinafter referred to as "hand gesture tracking"). In some embodiments, a user face and/or user hand gesture tracking device may be included as part of the robotic head 100.

In some embodiments, the neck system may include a pan-tilt unit 108. In some embodiments, the pan-tilt unit 108 may move the head in three degrees of freedom that may provide, for example, one-hundred to one-hundred fifty degrees of yaw (x-y), fifteen to thirty degrees of pitch (x-z plane), and/or fifteen to thirty degrees of roll (y-z plane). In some embodiments, the neck system may include the pan-tilt unit later described in FIGS. 3A and 3B. In some embodiments, the pan-tilt unit 108 may include one or more gears and/or servomotors 110. The gears may, for example, be low friction and/or constructed from plastic or similar material. The servomotors 110 may, for example, be brushless. In some embodiments, the gears may include any suitable gear ratio. In some embodiments, a first and a second gear may have a ratio of about 7:6. Also, the servomotors 110 may have any suitable speed, such as, for example, 0.15 sec/60° and/or 0.20 sec/60°. In some embodiments the suitable speed may be, for example, 0.05 sec/60°, 0.10 sec/60°, 0.15 sec/60°, 0.20 sec/60°, 0.30 sec/60°, 0.35 sec/60°, 0.40 sec/60°, etc. In some embodiments, the servomotors 110 may include one or more Hitec 7594SH servomotors, which may have a speed of 0.15 sec/60° and/or a torque of 333 oz-in, or other similar servomotor. The servomotors may have any other torque from about 20 oz-in to 500 oz-in or more. In some embodiments, the servomotors 110 may include one or more Futaba S3010 servomotors, which may have a speed of 0.20 sec/60° and/or a torque of 72 oz-in, or other similar servomotor. In some embodiments, a first servomotor may include a Hitec 7594SH servomotor, a Dynamixel servo motor, or other similar servomotor, and a second servomotor may include a Futaba S3010 servomotor or other similar servomotor. The design of the components of the neck system, including the pan-tilt unit 108, may allow it to be light, compact, and quiet. In some embodiments, the neck system and/or the projector 102 may be sized to be covered by the face mask 104. In some embodiments, the user may control the distance from the face mask 104 to the lens 106 in order to project the clearest possible image.

In some embodiments, the face mask 104 may be created using a mold of a 3D model. In some embodiments, the 3D model may include a neutral face. The mold may be, for example, created using a 3D printer and used to vacuum form a sheet of plastic or other material with similar properties. In some embodiments, the sheet may have a variety of thicknesses, such as, for example, approximately one-sixteenth, one-eighth, one-quarter, etc. of an inch thick. In some embodiments, the plastic may be translucent, clear, white, and/or acrylic plastic. The plastic may be coated by rear project paint.

In some embodiments, the face mask 104 may include various facial features. For example, the face mask 104 may include a nose-shaped portion that extends outwardly from the face mask 104. As another example, the face mask 104 may include two eye-shaped portions above the nose shaped portion. As another example, the face mask 104 may include a mouth-shaped portion that is positioned below the nose-shaped portion. Various other facial features may also be included such as, for example, cheeks, a forehead, a bridge, a chin, etc. The facial features of the face mask 104 may only be geometrically similar to real facial features and/or may not include any color.

In some embodiments, a wig 112 may be mounted on the robotic head 100. The wig 112 may be mounted to the robotic head 100 using any number of means; for example, a bar or band extending from a top of the face mask 104 to the projector 102. The wig 112 may cover any stray light coming from the sides of the face mask 104 and/or any joints between the face mask 104 and the head enclosure 206.

In some embodiments, the character animation application of the robotic head may create the facial image based on a multi-target morphing method. In some embodiments, the character animation application may process recorded utterances using a speech recognizer, such as, for example, Bavieca, an open source speech recognizer. In some embodiments, the speech recognizer may receive a sequence of words and a speech waveform as input and may provide a time-aligned phonetic transcription of the spoken utterance to the character animation application and/or produce a visual representation of the speech through the projector onto the face mask.

Any type of visual speech algorithm may be used to modify the image of the face in conjunction with speech or produce character animation images. One example, is a visual speech algorithm from Boulder Language Technologies. In some embodiments, the speech recognizer may represent aligned phonemes using, for example, the International Phonetic Alphabet (IPA). In some embodiments, the speech recognizer may group visually similar phonemes into units called visemes. For example, the consonants /b/, /p/, and /m/ in the words "buy," "pie," and "my" may form a single viseme class. English phonemes may be, for example, categorized into one or more classes, such as, for example, twenty viseme classes. In some embodiments, the viseme classes may represent articulation targets that lips and tongue move to during speech production.

In some embodiments, facial images may be designed for one or more viseme classes. In some embodiments, during speech production by the robotic head 100, the character animation application may receive the time-aligned phonetic transcription from the speech recognizer and convert the phonetic symbols into corresponding visemes. In some embodiments, the visemes may specify movements of the mouth and tongue, which may be synchronized with recorded or synthesized speech.

In some embodiments, the facial images may include one or more portions. For example, facial images may include three portions, including eyes, face, and hair. In some embodiments, the character animation application may interchange corresponding portions of the facial images. For example, an eye portion of a first facial image may be interchanged with an eye portion of a second facial image or, for example, a face portion of a first facial image may be interchanged with a face portion of a second facial image. In some embodiments, the character animation application may control the eye portion independently of the other portions of the facial image. In some embodiments, eye gaze may be controlled independently of facial expression. In some embodiments, the eye portion may be controlled in concert with, for example, face tracking and/or hand gesture tracking.

FIG. 1B is another perspective view of the robotic head 100 illustrated in FIG. 1A.

Figure 2A:
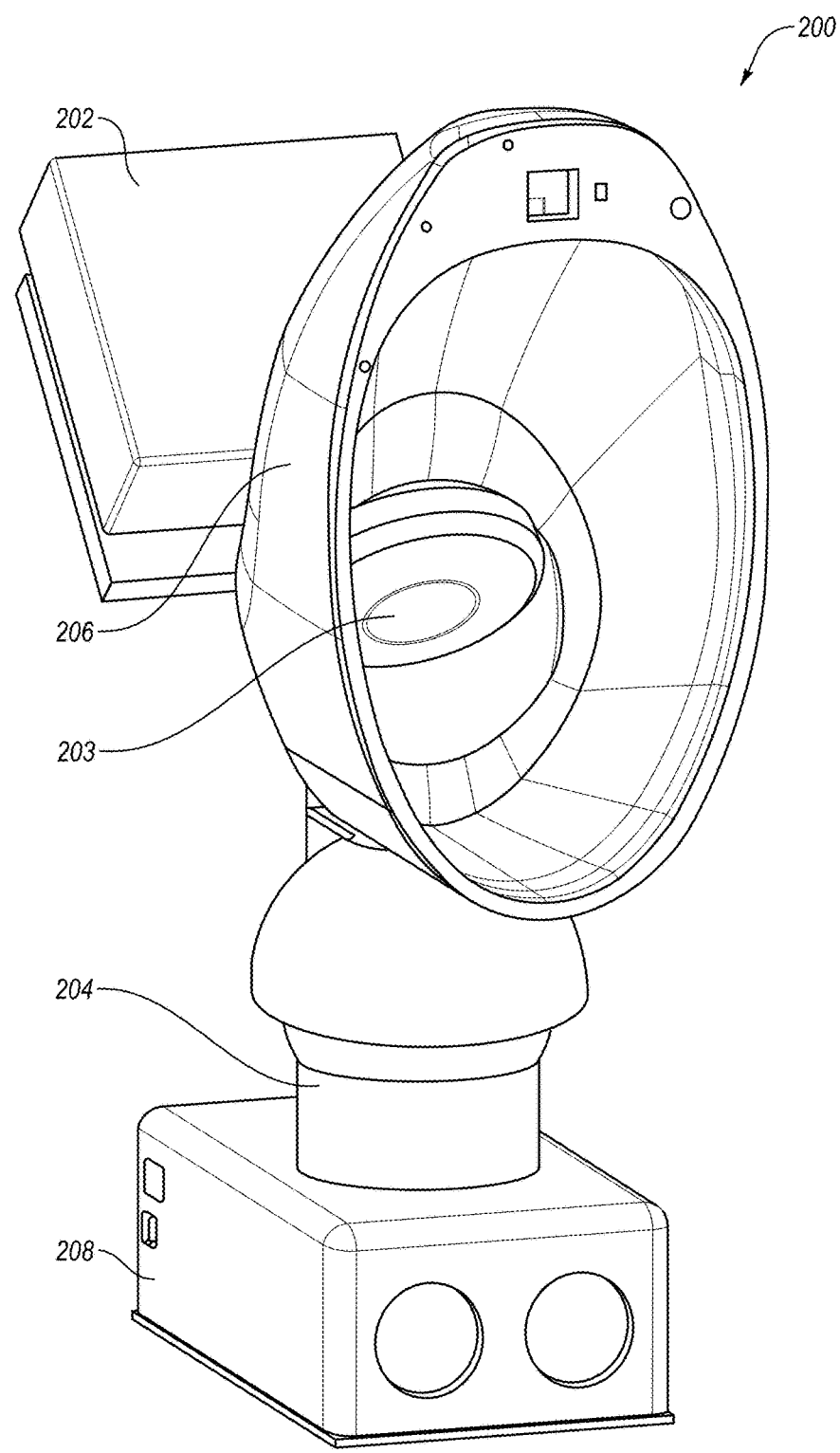
FIG. 2A is a perspective view of another example robotic head, with a face mask removed.

FIG. 2A is a perspective view of another example robotic head 200, with a face mask removed. Various or some aspects of the robotic head 200 may be similar and/or include aspects from robotic head 100. In some embodiments, the robotic head 200 may include a display system. In some embodiments, the display system may include a projector 202 that projects the facial image on a face mask of the robotic head 200. The projector 202 may include or correspond to the projector 102 of FIG. 1A or FIG. 1B. The projector 202 may include a lens 203 with a wide-projection angle, such as, for example, a fish eye lens. Specifically, in some embodiments, the lens 203 may include a 180 degree fish eye lens. In some embodiments, the lens 203 may allow a facial image to cover an entire face mask from a short baseline. Thus, in some embodiments, the robotic head 200 may have a small form factor. In some embodiments, the projector 202 may be located substantially close to the face mask and/or inside the robotic head 200. One or all components of the robotic head 200 may fit inside the robotic head 200. In some embodiments, the robotic head 200 may be portable.

In some embodiments, the robotic head 200 may include a neck system. The neck system may include a neck system 204. In some embodiments, the neck system may control the rotation, orientation, position, yaw, tilt, pan, pitch, and/or roll of the projector 202 and/or the face mask 210. The face mask 210 may include or correspond to the face mask 104 of FIG. 1A or FIG. 1B. In some embodiments, the robotic head 200 may include the character animation application described with respect to FIG. 1A or FIG. 1B. The character animation application, as described with respect to FIG. 1A or FIG. 1B, may control the neck system to rotate the face mask 210 for face tracking and/or hand gesture tracking.

In some embodiments, the robotic head 200 may include a head enclosure 206. In some embodiments, the head enclosure 206 may be shaped and sized to be human-like. The head enclosure 206, for example, may have a half-ovoid shape. The head enclosure 206, for example, may have a front side that has a concave shape and a back side that has a convex shape.

In some embodiments, the head enclosure may prevent any projected light from being scattered from the sides of the robotic head, which may make the projected facial image on the mask look brighter. For example, the head enclosure 206 may be substantially spherical to resemble the shape of a human head. In some embodiments, the projector 202 may be located within the head enclosure 206 or at the back of the head enclosure 206. Alternatively or additionally, the head enclosure 206 may include an opening through which the projector 202 may display a facial image. The projector 202 and/or lens 203 may fit through the opening on the rear side of the head enclosure 206. For example, the projector 202 may extend through the opening such that the lens 203 of the projector 202 may be located inside the head enclosure 206 while a portion of the projector 202 may be located outside and behind the head enclosure 206.

Figure 2B:
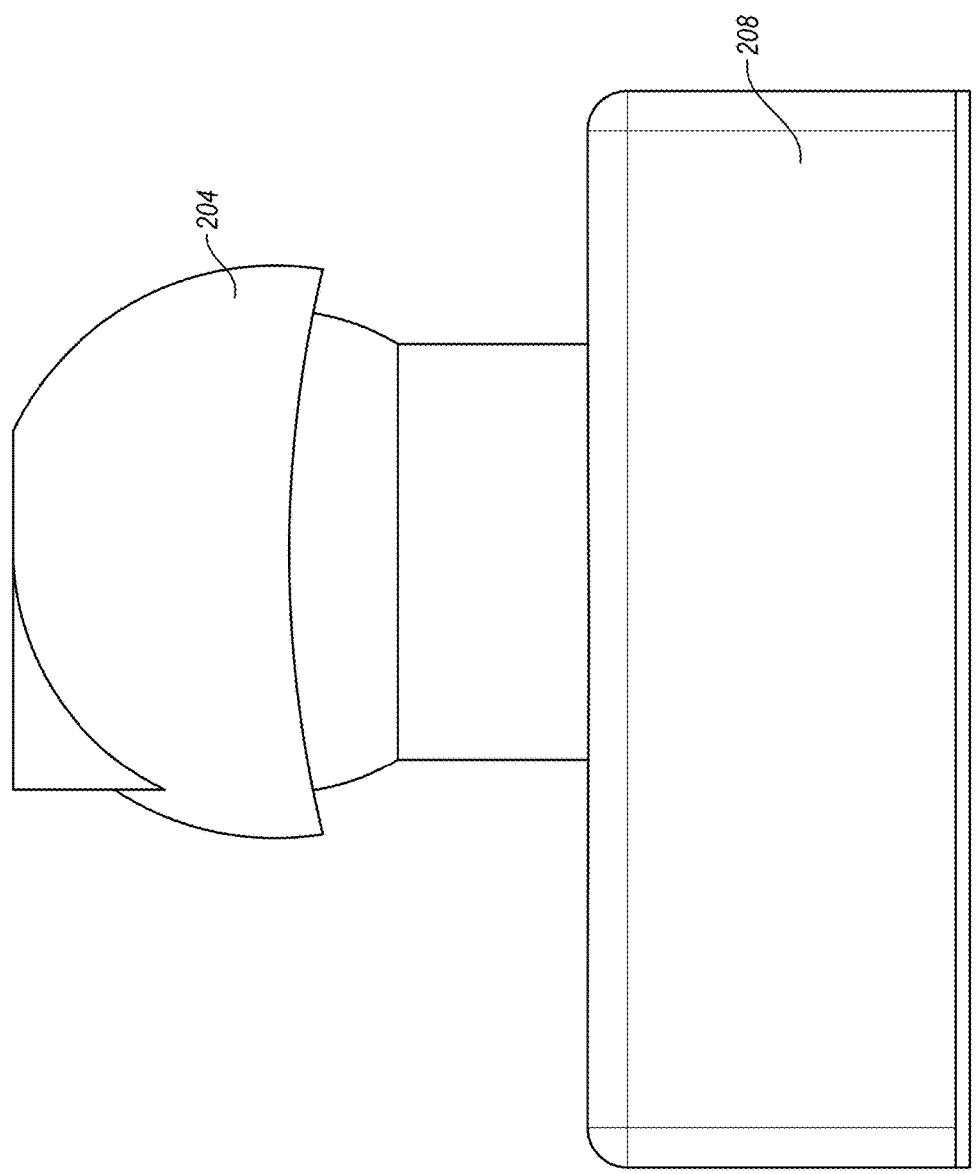
FIG. 2B is a transparent side view of an example neck system of the robotic head illustrated in FIG. 2A.

FIG. 2B is a transparent side view of an example neck system of the robotic head 200 illustrated in FIG. 2A. In some embodiments, the neck system may include a pan-tilt unit 208. In some embodiments, the pan-tilt unit 208 may include or correspond to the pan-tilt unit 108 of FIG. 1A and/or FIG. 1B. In some embodiments, the pan-tilt unit 208 may move the face mask 104 in two degrees of freedom. The pan-tilt unit 208, for example, may have a foot print of less than about thirty-six square inches.

As illustrated in FIG. 2C, in some embodiments, the neck system 204 may include a lower portion that may act as a base and provide support for the robotic head 200. In some embodiments, the lower portion may be substantially in a shape of a box. In some embodiments, the lower portion may be square, rectangular, or in another shape such as the shape of a human body torso that may provide support to the robotic head 200 and/or cover the pan-tilt unit 208. The neck system 204 may be shaped and sized to be human-like. A middle portion of the neck system 204 may be substantially in a form of a human neck. The middle portion may be cylindrical and may provide support for the robotic head 200. An upper portion of the neck system 204 may be substantially in a form of a human neck and/or human shoulders. The upper portion may be wider than the middle portion of the neck system 204. The neck system 204 may hide one or more wires and/or electrical components, and may also include locations to, for example, mount a USB and/or insert a power input.

Figure 2D:
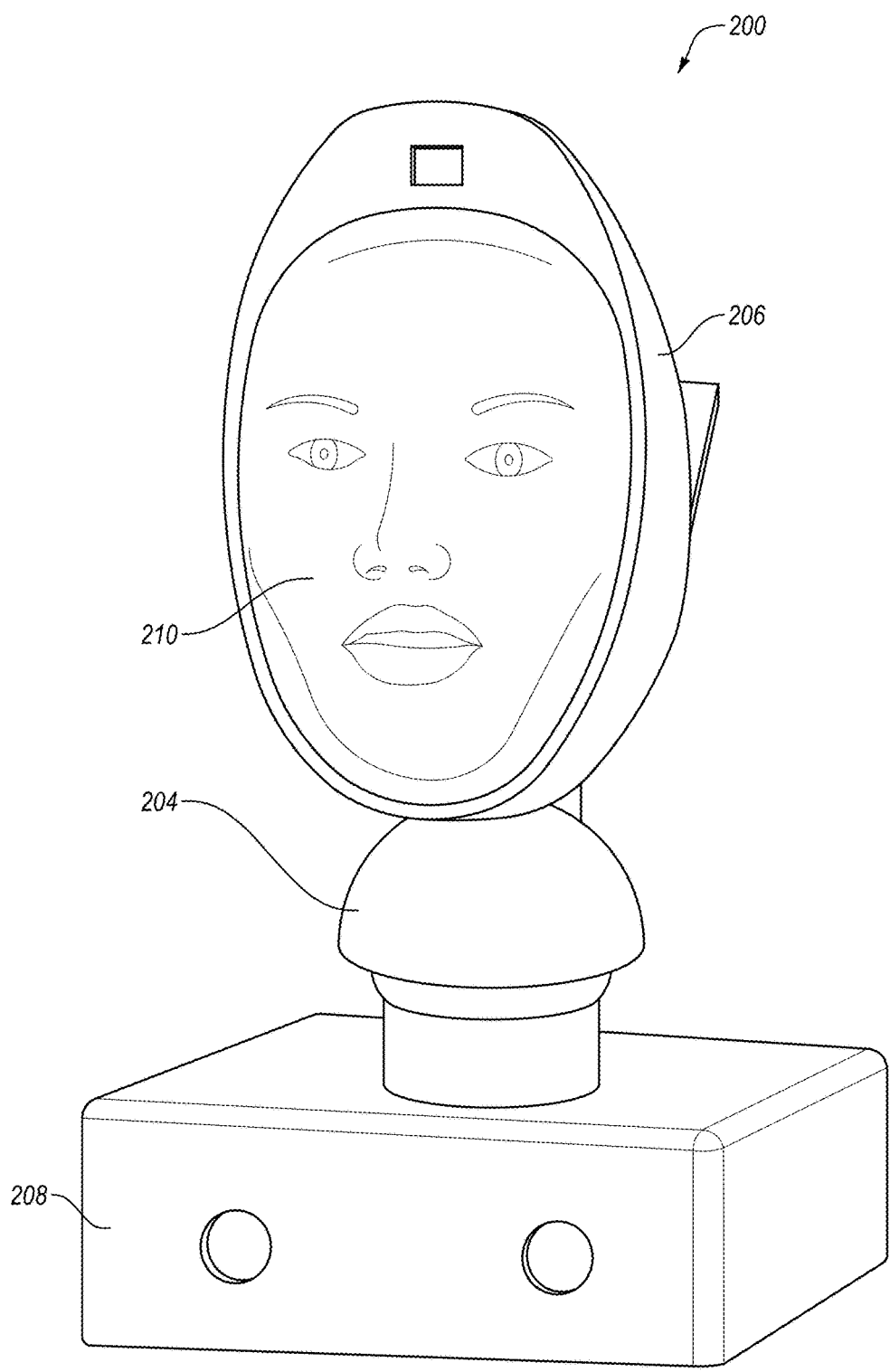
FIG. 2D is a perspective view of the robotic head illustrated in FIG. 2A, with an example facial image.

FIG. 2D is a perspective view of the robotic head 200 illustrated in FIG. 2A, with an example facial image. In some embodiments, a face mask 210 may be a translucent face mask onto which a 2D or 3D facial image may be light-projected. In some embodiments, the face mask 210 may act as a rear-projection screen to which the projector 202 may project. The face mask 210 may include or correspond to the face mask 104 of FIG. 1A or FIG. 1B. In some embodiments described, the face mask 210 may be removable and/or interchangeable. The face mask 210 may be attached to the head enclosure 206 using, for example, a clip, snap, tie, buckle, hook or another fastener. The face mask 210 may be created using a mold of a 3D model in the same or similar way as described with respect to face mask 104 of FIG. 1A or FIG. 1B, and may be easily and quickly customized. The face mask 210 may be constructed from plastic or similar material. The material may be translucent, white, and/or acrylic. An image may be calibrated to a new mask using the calibration method described in further detail in FIG. 4.

In some embodiments, the face mask 210 and/or head enclosure 206 may be sized to be covered by the face mask 210. In some embodiments, using the character animation application, the user may control the distance from the face mask 210 to the lens 203 in order to project the clearest possible image.

Figure 2E:
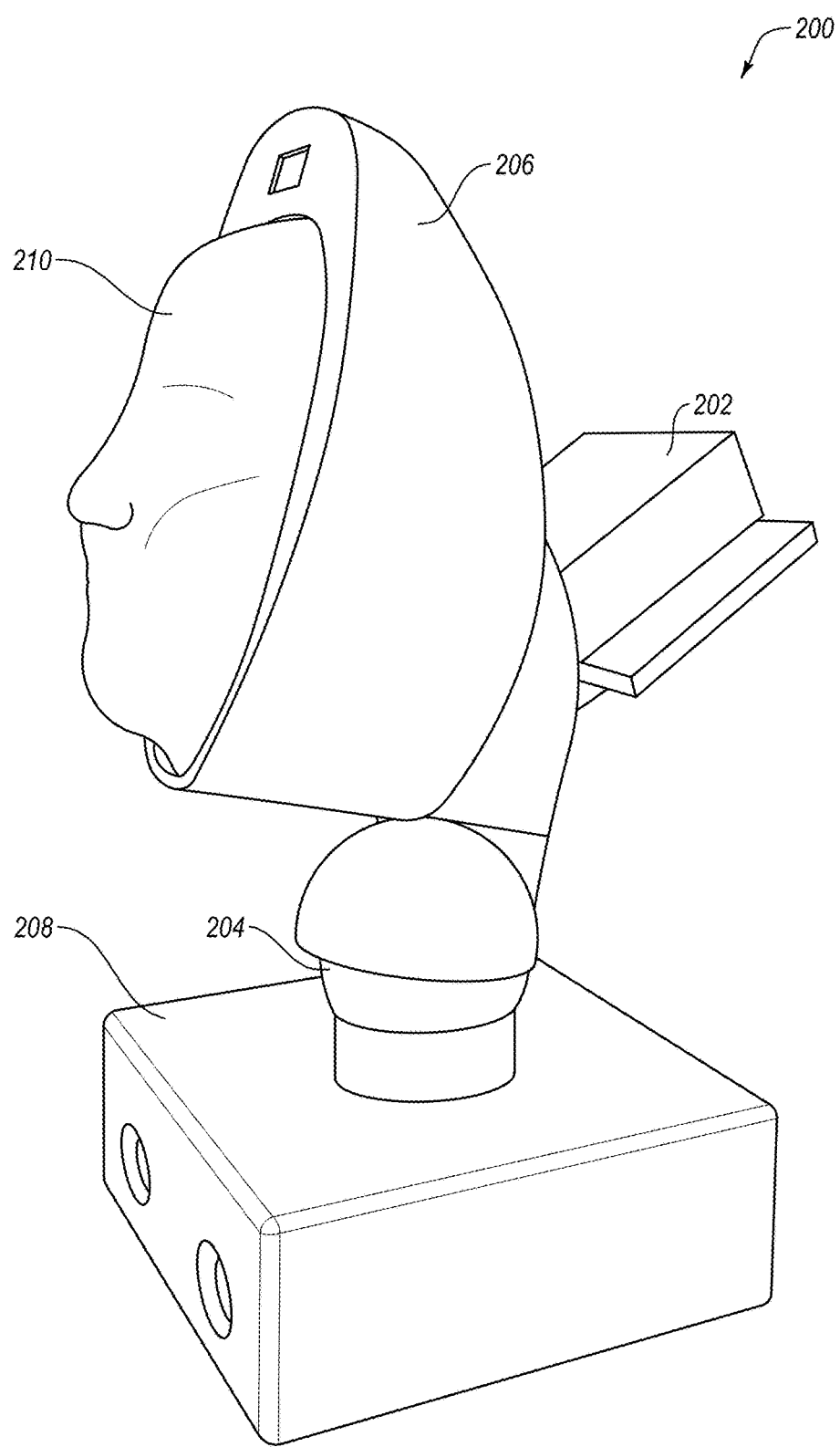
FIG. 2E is a side view of the robotic head illustrated in FIG. 2A.
Figure 2F:
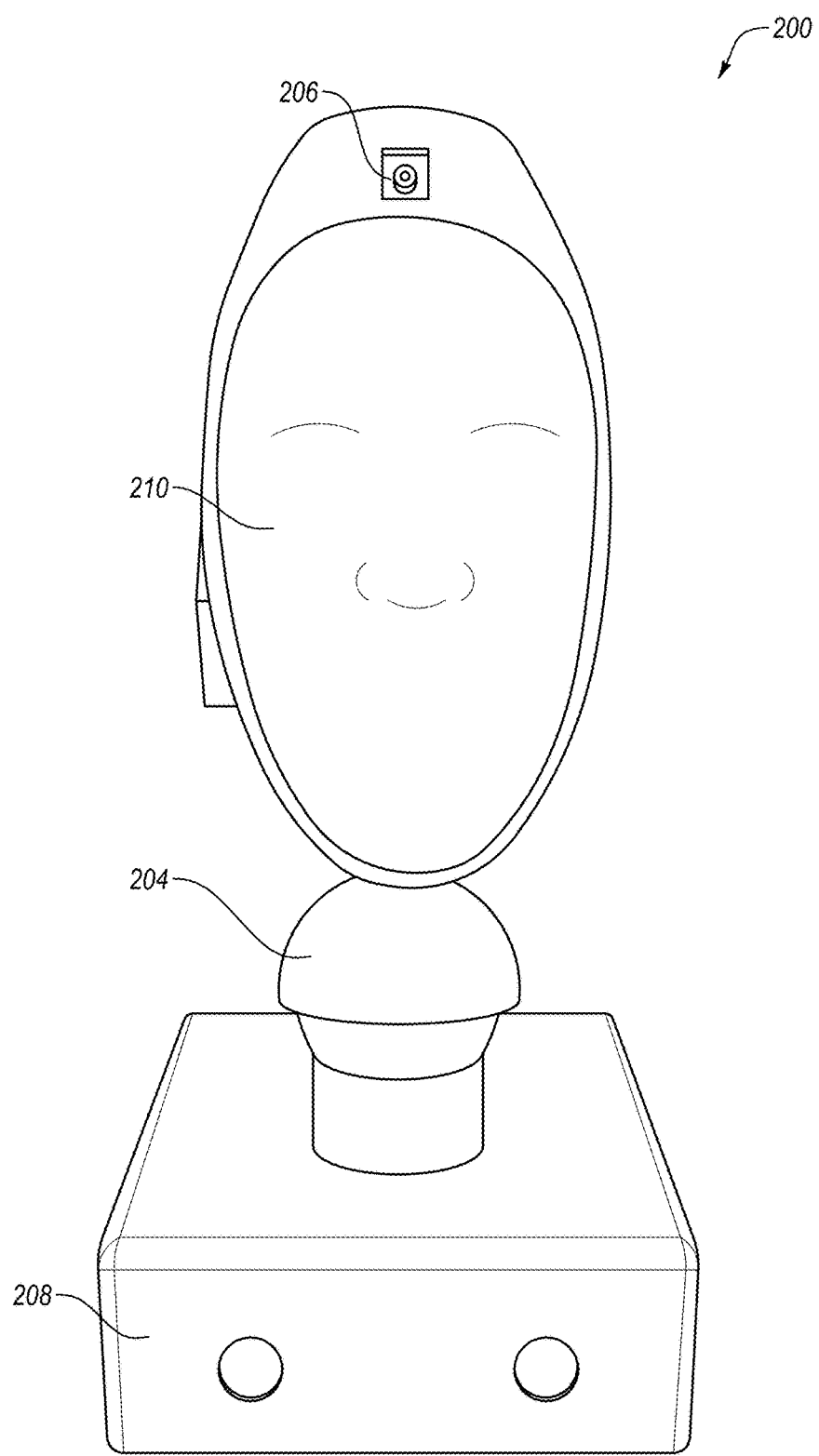
FIG. 2F is a front view of the robotic head illustrated in FIG. 2A.

As illustrated in FIGS. 2E and 2F, in some embodiments, the face mask 210 may include a neutral face capable of accommodating many different types of facial images and many facial expressions. In some embodiments, the face mask 210 may include smoothed features that resemble of a human face.

Figure 3A:
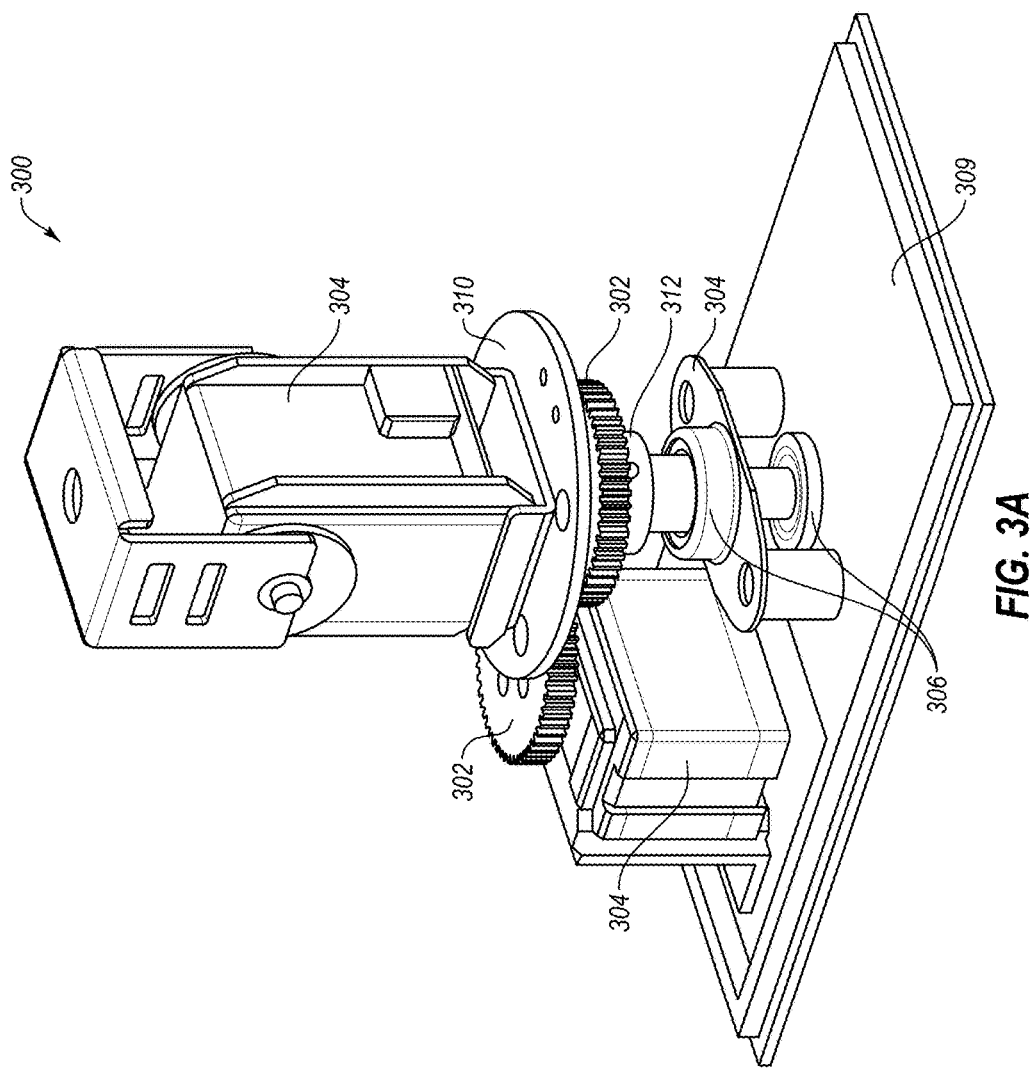
FIG. 3A is a perspective view of an example pan-tilt unit with two degrees of freedom.
Figure 3B:
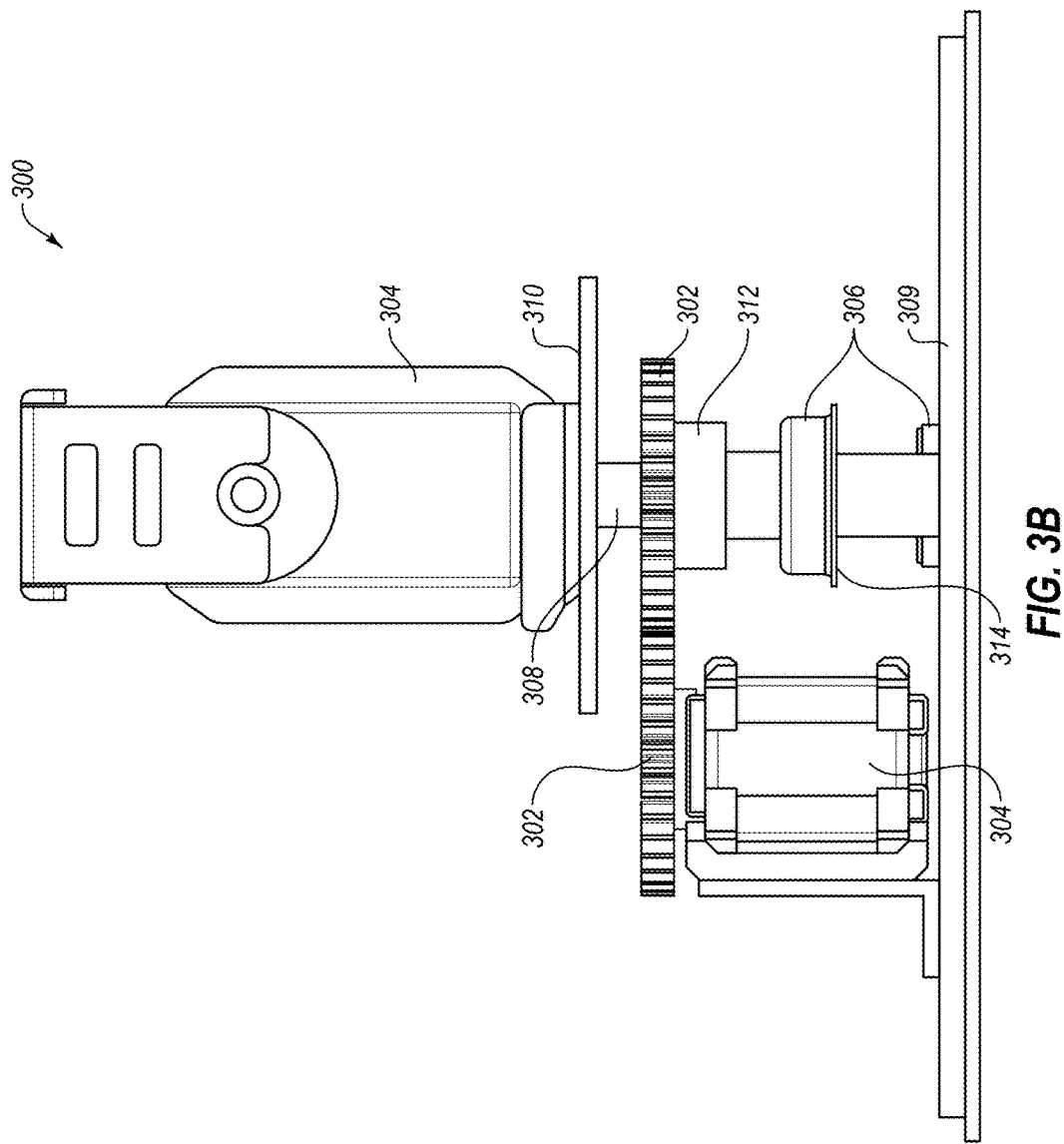
FIG. 3B is a side view of the pan-tilt unit illustrated in FIG. 3A.

FIG. 3A is a perspective view of an example pan-tilt unit 300 with two degrees of freedom. In some embodiments, the pan-tilt unit 300 may be included in the neck system of robotic head 100 and/or robotic head 200. In some embodiments, the pan-tilt unit 300 may move the robotic head 100 and/or robotic head 200 with two degrees of freedom, such as, for example, pitch and yaw. In some embodiments, the pan-tilt unit 300 may include one or more gears 302 and/or servomotors 304. In some embodiments, the gears 302 may, for example, be low friction and/or constructed from plastic or a similar material. In some embodiments, the servomotors 304 may, for example, be brushless. In some embodiments, the servomotors 304 may support the weight of the projector 202 and/or the head enclosure 206. The lens 203 may be located at a distance above the servomotors 304, such as, for example, approximately six to eight inches. In some embodiments, the pan-tilt unit 300 may include one or more bearings 306. In some embodiments, the bearings 306 may provide points of support for the pan-tilt unit 300. In some embodiments, the bearings 306 may be located on a vertical rod 308. In some embodiments, a gear hub 312 attached to the one or more gears 302 may be connected to the vertical rod 308 by a fastener, such as, for example, a pin. In some embodiments, the a first end of the vertical rod 308 may located proximate to the base 309 of the pan-tilt unit 300, and a second end of the vertical rod 308 may be attached to a platform 310. In some embodiments, the first end of the vertical rod 308 may not touch the base 309. In some embodiments, a tilt system of the pan-tilt unit 300 may be located on top of the platform 310, which may be supported by the vertical rod 308. In some embodiments, the bearings 306 and vertical rod 308 may allow the robotic head 200 to turn or swivel around a stable central axis through the use of the gears 302.

The pan-tilt unit 300 may include, for example, two or more bearings 306 on the vertical rod 308, which may be located a distance away from each other on the vertical rod 308. In some embodiments, the two bearings 306 may be located, for example, approximately two inches away from each other on the vertical rod 308. In some embodiments, a first of the two bearings 306 may be attached or embedded to the base 309 and may reduce bending moment to prevent wobbling. In some embodiments, a second of the two bearings 306 may be located above the first of the two bearings 306 on the vertical rod 308 and may support a vertical load. In some embodiments, the second of the two bearings 306 may be located towards the middle of the vertical rod 308. In some embodiments, the second of the two bearings 306 may be attached to a platform 314, which may be supported by one or more legs to provide additional support for the vertical rod 308. In some embodiments, the second of the two bearings 306 may be located approximately two inches above the first of the two bearings 306. In some embodiments, the bearings 306 may include a flange mount and/or one or more screw to attach to the vertical rod 308 to support a vertical load. In some embodiments, the vertical rod 308 may be constructed of aluminum or a similar material capable of providing support.

In some embodiments, a facial image may correspond to a facial expression, such as, for example, neutral, anger, disgust, fear, joy, sadness, or surprise. In some circumstances, an emotion and a viseme may conflict when combined in a facial expression. Conflicting facial expressions and visemes may be blended by the character animation application according to various models in order to avoid any unnatural appearance resulting from combining an emotion with a viseme. For example, in order to avoid any unnatural appearance resulting from combining an emotion with a viseme, a viseme and an emotion that are to be combined may be assigned a weight factor and a maximum emotion weight, respectively.

In Some embodiments, the facial expression morph targets may be split into upper and lower face morph targets. The upper face targets, for example, may include everything from the tip of the nose upwards. The lower face targets, for example, may include the region below the nose; mainly the lips, lower cheeks and chin. This partitioning of the face may enable us to adjust the weight of just the lower face morph target weights so that the upper face may remain consistent with the morph targets of desired expressions. For labial and labiodental visemes (those for the letters m, b, p, f and v) that require the avatar's lips to be closed or nearly closed to look natural, visemes pre-blended with the open mouthed emotions may be used. These may be used to replace the viseme and lower face expression when they come up in combination.

Some embodiments include a robotic head projection calibration method. The calibration method, for example, may be used to determine any image distortion caused by the optical system, lens, mirrors, projector, and/or the face mask. The method may include projecting a two-dimensional image of a face with a plurality of fiducial marker points onto a rear surface of a face mask. The plurality of fiducial marker points may include, for example, a plurality of grid lines. The plurality of fiducial marker points may include, for example, points that correspond to facial features such as, for example, corners of one or more eyes, corners of the mouth, points of the noise, points on the chin, points on the eyebrows, etc.

In some embodiments, an image of the face mask may be recorded with the plurality of fiducial marker points projected onto the rear surface of the face mask. The image may be recorded, for example, using a camera disposed within the robotic head.

In some embodiments, a plurality of distances between the location of each of the plurality of fiducial marker points on the face mask relative to an expected location of each of the plurality of fiducial marker points on the face mask may be determine. For example, if one of the fiducial marker points is the corner of the left eye. The distance between the corner of the left eye and the actual position of the fiducial marker point on the face mask may be determined or estimated based on the recorded image of the facemask. The distance, for example, may be determined as the number of pixels between the fiducial marker point and the corner of the left eye.

In some embodiments, a transformation based on the plurality of distances between the fiducial marker points and the actual positions on the face mask may be calculated. In some embodiments, the transformation may be applied to two-dimensional images of a face prior to projecting the images on the face mask. In some embodiments, the inverse of the transformation may be applied.

In some embodiments, a character animation application may be used to calibrate the facial image to reduce any distortion of the facial image on the face mask 104 and/or the face mask 210 that may be caused by a projector and/or a lens. In some embodiments, the character animation application may calibrate the facial image one time prior to run-time, or it may calibrate the facial image at run time in each frame. In some embodiments, in order to achieve a smooth animation displaying at, for example, thirty frames-per-second (fps), the original facial image may be calibrated instead of rectifying the facial image at run time in each frame.

In some embodiments, in order to calibrate the facial image, a flat screen may be placed approximately in front of or behind the face mask 104 and/or the face mask 210. A neutral 3D facial image may be mapped, for example, to screen coordinates according to the following expression:

$$S=NWVP$$

Figure 4A:
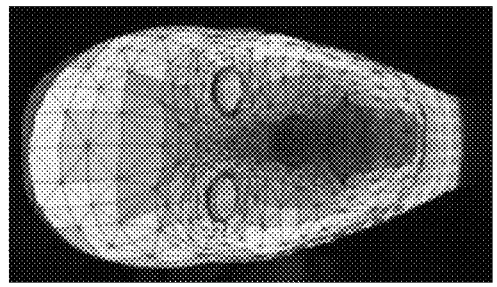
FIGS. 4A, 4B, 4C, and 4D illustrate an example calibration method.

In the above-expression, N represents a model of the neutral 3D facial image in virtual 3D coordinates, as illustrated in FIG. 4A. W, V, and P represent world (W), view (V), and projection (P) matrices, respectively. S may represent a model of the neutral 3D facial image mapped to screen coordinates, as illustrated in FIG. 4B.

Figure 4B:
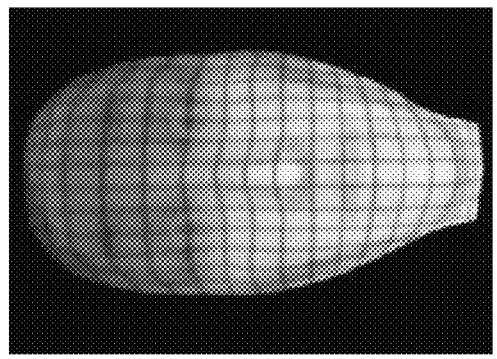
Figure 4C:
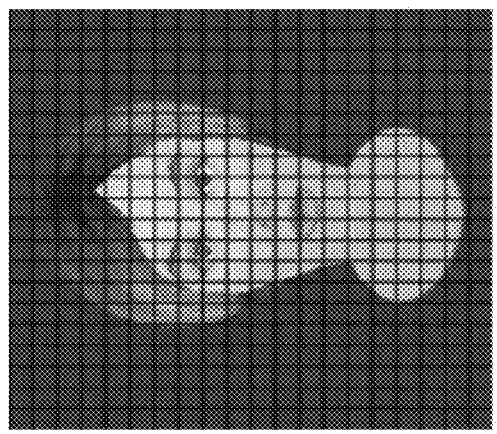

M may represent a model of S projected to the face mask, as illustrated in FIG. 4C, or in other words, M=project(S). M' may represent a distorted model of S that appears undistorted when projected to the face mask. In some embodiments, the character animation application may find N', where N' may represent a distorted model of the neutral 3D facial image in virtual 3D coordinates, such that M'=project(S') looks undistorted on the face mask, where $$S'=N'WVP.$$

Figure 4D:
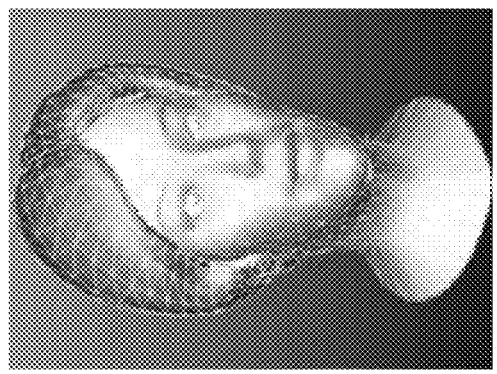

In some embodiments, the character animation application may create a checkerboard in the screen coordinates, as illustrated in FIG. 4B, which may be projected on the face mask, as illustrated in FIG. 4C. In some embodiments, the character animation application may define a piecewise homography or other geometry transformations mapping between rectangles projected on the face mask and triangles on an image of the face mask displayed on the screen, as illustrated in FIG. 4D. In some embodiments, in order to find M', the character animation application may apply an affine transformation to place a mold, used to create the face mask, on an image of the face mask, as illustrated in FIG. 4D. Further, in some embodiments, the character animation application may apply the piecewise homography or other geometry transformations on the mold model and replace the corresponding vertices of the model of the neutral facial image in the screen coordinates, S, with a distorted mold model to estimate S'. N' may be determined according to the expression:

$$N'=S'(WVP)^{-1},$$

where N', S', W, V, and P are defined as above. The character animation application use the above described calibration method to display a wide variety of facial images on the face mask 104 and/or the face mask 210, such as, for example, cartoon-like, animated, and/or photorealistic facial images.

In some embodiments, the robotic head 100 and/or the robotic head 200 may include one or more speakers that are used to produce audio speech. In some embodiments, the robotic head 100 and/or the robotic head 200 may include a proximity detector that may recognize facial expressions and/or body language of a user. The visual speech and/or animation provided by the robotic head may be in response to the facial expressions and/or the body language of the user. In some embodiments, the robotic head 100 and/or the robotic head 200 may include a computer system that may be used to run calibration processes, speech recognition, speech responses, visual animation, etc.

The term "substantially" means within 5% or 10% of the value referred to or within manufacturing tolerances.

Various embodiments are disclosed. The various embodiments may be partially or completely combined to produce other embodiments.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for-purposes of example rather than limitation, and does not preclude inclusion of such modifications, variations, and/or additions to the present subject matter as would be readily apparent to one of ordinary skill in the art.

What is claimed is:

1. A robotic head comprising:
   a head enclosure;
   a translucent face mask coupled with the head enclosure, the face mask having a front side and a rear side, the face mask comprising a plurality of facial features;
   a neck system coupled with the head enclosure;
   a pan-tilt unit coupled with the neck system and configured to move the head enclosure and the face mask;
   a projector disposed within the head enclosure and disposed to project images of a face onto the rear side of the face mask, wherein the projector is configured to project a two-dimensional image of a face with a plurality of fiducial marker points onto the rear side of the face mask;
   a lens with a wide-projection angle through which the projector projects the two-dimensional image of the face onto the rear side of the face mask; and
   a camera configured to record an image of the face mask with the plurality of fiducial marker points projected onto the rear side of the face mask; and a processor coupled with the camera and configured to:
  determine a plurality of distances between the location of each of the plurality of fiducial marker points on the face mask relative to an expected location of each of the plurality of fiducial marker points on the face mask;
  calculate a transformation based on the plurality of distances; and
  apply the transformation to two-dimensional images of a face.

2. The robotic head according to claim 1, wherein the pan-tilt unit and/or the neck system moves the head enclosure with two or three degrees of freedom.

3. The robotic head according to claim 1, wherein the neck system and/or the pan-tilt unit further comprises at least one of a servomotor and a gear.

4. The robotic head according to claim 1, wherein the face mask is removably coupled with the head enclosure.

5. The robotic head according to claim 1, wherein the projector is configured to project changes in facial expression onto the rear side of the face mask.

6. A robotic head comprising:
  a head enclosure;
  a translucent face mask coupled with the head enclosure, having a front side and a rear side;
  a neck system coupled with the head enclosure and configured to move the head enclosure; and
  a projector disposed within the head enclosure and disposed to project images of a face onto the rear side of the face mask, wherein the projector is configured to project a two-dimensional image of a face with a plurality of fiducial marker points onto the rear side of the face mask;
  a camera configured to record an image of the face mask with the plurality of fiducial marker points projected onto the rear side of the face mask; and
  a processor coupled with the camera and configured to:
    determine a plurality of distances between the location of each of the plurality of fiducial marker points on the face mask relative to an expected location of each of the plurality of fiducial marker points on the face mask;
  calculate a transformation based on the plurality of distances; and
  apply the transformation to two-dimensional images of a face.

7. The robotic head according to claim 6, further comprising a lens with a wide-projection angle through which the projector projects images of a face onto the rear side of the face mask.

8. The robotic head according to claim 6, wherein the face mask is removably coupled with the head enclosure.

9. The robotic head according to claim 6, wherein the face mask includes a plurality of facial features.

10. The robotic head according to claim 6, wherein the projector is coupled with an external rear portion of the head enclosure, and the head enclosure includes a hole through which the projector projects images of a face onto the rear side of the face mask.

11. The robotic head according to claim 6, wherein the neck system includes a pan-tilt unit that moves the head enclosure with two or three degrees of freedom.

12. The robotic head according to claim 6, wherein the neck moves the head enclosure with one-hundred to one-hundred fifty degrees of yaw, fifteen to thirty degrees of pitch, and fifteen to thirty degrees of roll.

13. The robotic head according to claim 6, wherein the head enclosure has a shape that is substantially half ovoid.

14. The robotic head according to claim 6, further comprising a wig.

15. The robotic head according to claim 6, wherein the neck comprises at least one of a servomotor and a gear.

16. The robotic head according to claim 6, wherein the projector is configured to project changes in facial expression onto the rear side of the face mask.

17. A robotic head projection calibration method comprising:
  projecting a two-dimensional image of a face with a plurality of fiducial marker points onto a rear surface of a face mask;
  recording an image of the face mask with the plurality of fiducial marker points projected onto the rear surface of the face mask;
  determining a plurality of distances between the location of each of the plurality of fiducial marker points on the face mask relative to an expected location of each of the plurality of fiducial marker points on the face mask;
  calculating a transformation based on the plurality of distances; and
  applying the transformation to two-dimensional images of a face.

18. The robotic head projection calibration method according to claim 17, wherein the applying the transformation to two-dimensional images of a face further comprises applying the inverse of the transformation to two-dimensional images of a face.

19. The robotic head projection calibration method according to claim 17, wherein the plurality of fiducial marker points comprise a plurality of grid lines.

* * * * *